United States Patent
Nagamine et al.

(10) Patent No.: US 9,156,402 B2
(45) Date of Patent: Oct. 13, 2015

(54) WIDE VIEW VEHICLE PERIPHERY IMAGE GENERATION APPARATUS

(75) Inventors: Noboru Nagamine, Anjo (JP); Kazuya Watanabe, Anjo (JP); Tomoyuki Matsuba, Anjo (JP); Jun Kadowaki, Kariya (JP); Toshihiro Mori, Okazaki (JP); Yuuichi Ooshita, Nagoya (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 666 days.

(21) Appl. No.: 13/388,619

(22) PCT Filed: Jul. 28, 2010

(86) PCT No.: PCT/JP2010/062658
§ 371 (c)(1),
(2), (4) Date: Feb. 2, 2012

(87) PCT Pub. No.: WO2011/016368
PCT Pub. Date: Feb. 10, 2011

(65) Prior Publication Data
US 2012/0127312 A1    May 24, 2012

(30) Foreign Application Priority Data

Aug. 3, 2009 (JP) ................................. 2009-180561
Jul. 20, 2010 (JP) ................................. 2010-163229

(51) Int. Cl.
*H04N 7/18* (2006.01)
*B60R 1/00* (2006.01)

(52) U.S. Cl.
CPC *B60R 1/00* (2013.01); *H04N 7/181* (2013.01); *B60R 2300/105* (2013.01);
(Continued)

(58) Field of Classification Search
CPC G06K 9/00791; G06T 7/2006; G06T 7/2066; G06T 2207/10028; G06T 2207/30261; G06T 2207/10016; G08G 1/16; B60R 1/00; B60R 2300/105; B60R 2300/303; B60R 2300/605; B60R 2300/607; B60R 2300/804; B60R 2300/306; H04N 7/181

USPC .......................................................... 348/148
See application file for complete search history.

(56) References Cited

U.S. PATENT DOCUMENTS 6,947,611 B2    9/2005  Kawakami et al.
7,161,616 B1 *  1/2007  Okamoto et al. ............. 348/148
(Continued)

FOREIGN PATENT DOCUMENTS

JP    2002-109697 A    4/2002
JP    2002-334322 A    11/2002
(Continued)

OTHER PUBLICATIONS

International Preliminary Report on Patentability for PCT/JP2010/062657 dated Mar. 22, 2012.
International Search Report for PCT/JP2010/062658 dated Sep. 7, 2010.

*Primary Examiner* — Dave Czekaj
*Assistant Examiner* — Leron Beck
(74) *Attorney, Agent, or Firm* — Sughrue Mion, PLLC (57) ABSTRACT

A vehicle periphery image generation apparatus for generating a vehicle periphery image with a wide view. The apparatus includes an image acquisition unit that acquires vehicle periphery images obtained by vehicle mounted photographic cameras, a display device, a viewing point position setting unit that sets the position to a viewing point from a perpendicular upward direction, a fish-eye image generation unit for generating a fish-eye image using the periphery images and a position set by the viewing point position setting unit, a self vehicle image generation unit that generates a self vehicle image as the fish-eye image with the position set by the viewing point position setting unit, and a display image generation unit for generating an image to be displayed on the display device using the fish-eye image and the self vehicle image, wherein the position of the viewing point of the fish-eye image can be changed.

6 Claims, 6 Drawing Sheets

(52) U.S. Cl.
CPC .... *B60R 2300/303* (2013.01); *B60R 2300/306* (2013.01); *B60R 2300/605* (2013.01); *B60R 2300/607* (2013.01); *B60R 2300/804* (2013.01)

(56) References Cited

U.S. PATENT DOCUMENTS

| | | | | |
|---|---|---|---|---|
| 7,212,653 | B2 * | 5/2007 | Sato et al | 382/104 |
| 7,643,911 | B2 * | 1/2010 | Ishihara et al. | 701/1 |
| 2006/0029255 | A1 * | 2/2006 | Ozaki | 382/104 |
| 2009/0097708 | A1 * | 4/2009 | Mizuta | 382/103 |
| 2010/0045448 | A1 * | 2/2010 | Kakinami | 340/435 |

FOREIGN PATENT DOCUMENTS

| | | | |
|---|---|---|---|
| JP | 2003-030627 | A | 1/2003 |
| JP | 2003-346189 | A | 12/2003 |
| JP | 3475507 | B2 | 12/2003 |
| JP | 2005-167309 | A | 6/2005 |
| JP | 3847547 | B2 | 11/2006 |
| JP | 2007-265202 | A | 10/2007 |
| JP | 2009-171537 | A | 7/2009 |
| WO | WO 00/64175 | A1 | 10/2000 |

* cited by examiner

WIDE VIEW VEHICLE PERIPHERY IMAGE GENERATION APPARATUS

CROSS REFERENCE TO RELATED APPLICATION

This application is a National Stage of International Application No. PCT/JP2010/062658, filed on Jul. 28, 2010, claiming priority based on Japanese Patent Application Nos. 2009-180561, filed Aug. 3, 2009, and JP 2010-163229, filed Jul. 20, 2010, the contents of all of which are incorporated herein by reference in their entirety.

TECHNICAL FIELD

The present invention relates to a vehicle periphery image generation apparatus for generating a vehicle periphery image showing the peripheral condition of a vehicle with using vehicle periphery images photographed by vehicle-mounted cameras.

BACKGROUND ART

A vehicle mounts side mirrors and a rear view mirror for confirming its peripheral condition. However, there exist blind corners where confirming the outside view is not possible from the driver's seat due to the vehicle construction, even with using these mirrors. In an attempt to minimize such blind corners, some vehicles are mounted with additional mirrors (mounted e.g. near the engine hood or the rear gate). Even with using such additional mirrors, it is still not easy to eliminate the blind corners completely. Moreover, mounting of such additional mirrors impairs the aesthetic appearance of the vehicle. In view of these problems, in recent years, there has been utilized a technique of confirming the peripheral condition of the vehicle with using vehicle periphery images (photographed image) obtained by cameras mounted at respective portions of the vehicle (e.g. Patent Documents 1-4, etc.)

According to the technique disclosed in Patent Documents 1-3, an icon comprising a graphically rendered image of the self-vehicle is laid at the center of a display image and photographic images obtained by cameras mounted on the vehicle are subject to coordinate conversion to be rendered into images taken from a viewing potion from the perpendicularly upward direction of the vehicle and these images are shown around the icon, thereby to allow monitoring of the periphery of the vehicle.

Further, an image display apparatus for a vehicle described in Patent Document 4 is comprised of a plurality of cameras mounted on the vehicle. With this image display apparatus for a vehicle, based on photographic images obtained by the plurality of cameras, a projection image projected from a predetermined viewing point upwardly of the vehicle is generated. Then, graphic data of the vehicle from the viewing point upwardly of the vehicle are displayed in superposition on the generated projection image.

PRIOR ART DOCUMENTS

Patent Documents

Patent Document 1: the specification of the Japanese Patent No. 3847547

Patent Document 2: the specification of the Japanese Patent No. 3475507

Patent Document 3: the official gazette of Japanese Patent Application Publication No. 2003-30627

Patent Document 4: the official gazette of Japanese Patent Application Publication No. 2003-346189

SUMMARY OF THE INVENTION

Problems to be Solved by Invention

The mode of displaying an image from the viewing point along the perpendicularly upward direction as is the case with the techniques disclosed in Patent Documents 1-3 is referred to as the so-called "top view image". With the displaying mode such as this top view image, there is the problem that it is not possible to view the periphery of the vehicle over a wide and distant area. With the top view image, the display device displays only the vicinity of the vehicle, so that recognition of an obstacle such as a pedestrian approaching the traveling direction at the time of backing becomes possible only after the obstacle comes very close to the vehicle or the presence of the obstacle may be overlooked entirely. For this reason, with the presently commercialized products, the display device is configured to display not only the top view image, but also an image rearwardly of the vehicle, simultaneously.

According to the technique disclosed in Patent Document 4, there is disclosed a method of projecting onto a plane of projection viewed obliquely downward from a predetermined position upwardly of the vehicle. In the case of this method, as compared with the method of projecting onto the plane of projection viewed perpendicularly downward, there is an advantage of allowing three-dimensional displaying of a caution-requiring side in the case of the obliquely downward viewing, thus allowing instinctive recognition of an approaching object and also enlarging the field of view correspondingly. However, because of the oblique angle, the immediately downward side of the vehicle opposite to the viewing point becomes difficult to view, so wide and distant simultaneous viewing of the entire vehicle periphery is not possible.

The object of the present invention is to provide a vehicle periphery image generation apparatus for generating a vehicle periphery image that can command a wide view of the vehicle image at a time.

Means for Solving Problem

For accomplishing the above-noted object, according to the characterizing feature of a vehicle periphery image generation apparatus of the present invention, the apparatus comprises: an image acquisition unit for acquiring vehicle periphery images photographed by a plurality of photographic cameras mounted on the vehicle; a display device provided in the vehicle interior for displaying the images; a viewing point position setting unit for setting the position as the viewing point of the image to be displayed on the display device to a viewing point from a perpendicular upward direction; a fish-eye image generation unit for generating a fish-eye image with using the periphery image and the position set by the viewing point position setting unit; a self vehicle image generation unit for generating a self vehicle image; and a display image generation unit for generating an image to be displayed on the display device with using the fish-eye image and a self vehicle image, wherein the position of the viewing point of the fish-eye image can be changed.

In the above, an arrangement of displaying only a photographic image obtained by a wide-angle camera having distortion in the photographic plane does not allow easy recognition of the distance or size. However, as the arrangement displays the self vehicle image representing the self vehicle with a distortion also in accordance with the distortion of the angle of view, instinctive grasping of the distance or size is possible. Accordingly, with this arrangement, since the display device displays the vehicle periphery as a fish-eye image, the vehicle periphery can be viewed extensively at a time. Further, since the viewing point of the fish-eye image is from the perpendicularly upward direction, the position or size of an object included in the fish-eye image can be easily grasped instinctively. Further, the position of the viewing point of the fish-eye image can be changed, depending on a vehicle condition based upon result of detection of a sensor device and also the user can change the viewing point of the fish-view image as desired. Therefore, even when the position of interest has changed according to the condition, it is still possible to display a fish-view image from an appropriate viewing point. Further, the application of the above arrangement is not limited to a self vehicle, but the arrangement can be applied also to a virtual graphic image of an obstacle, a pedestrian, a parking assist guide display, etc. which is virtually graphically rendered on an image obtained by using a wide-angle camera including a fish-eye camera. So, the arrangement achieves a further effect of alleviating the demerit of the fish-eye camera, i.e. the "difficulty of instinct grasping of distance".

Further, preferably, said self vehicle image is generated from a fish-eye image with the position set by the viewing point position setting unit as the viewing point thereof.

With the above arrangement, it becomes possible to display a fish-eye image with a viewing point according to the current condition of the vehicle.

Preferably, the viewing point position is changed within a horizontal plane normal to the perpendicular direction.

With the above arrangement, even when the position of interest has changed due to the situation, it is still possible to display a fish-view image from an appropriate viewing point.

Preferably, the self vehicle image generation unit generates the self vehicle image with its length reduced.

With the above arrangement, it becomes possible to display the areas forwardly and rearwardly of the vehicle extensively.

Further, preferably, the position of the viewing point of the fish-eye image can be changed in response to a user's operation.

With the above arrangement, the user can change the viewing point position of the fish-eye image as desired, in accordance with the driving condition or the condition around the vehicle. Therefore, it becomes possible to display a fish-eye image from an appropriate viewing point according to the driving condition or the condition around the vehicle.

Further, preferably, the position of the viewing point of the fish-eye image can be changed, in accordance with result of detection by a sensor device mounted on the vehicle.

With the above-described arrangement, the viewing point position of the fish-eye image can be automatically changed in accordance with the vehicle condition based upon the detection result of the sensor device. Therefore, it becomes possible to display a fish-eye image from an appropriate viewing point according to the vehicle condition.

MODE OF EMBODYING THE INVENTION

Figure 1:
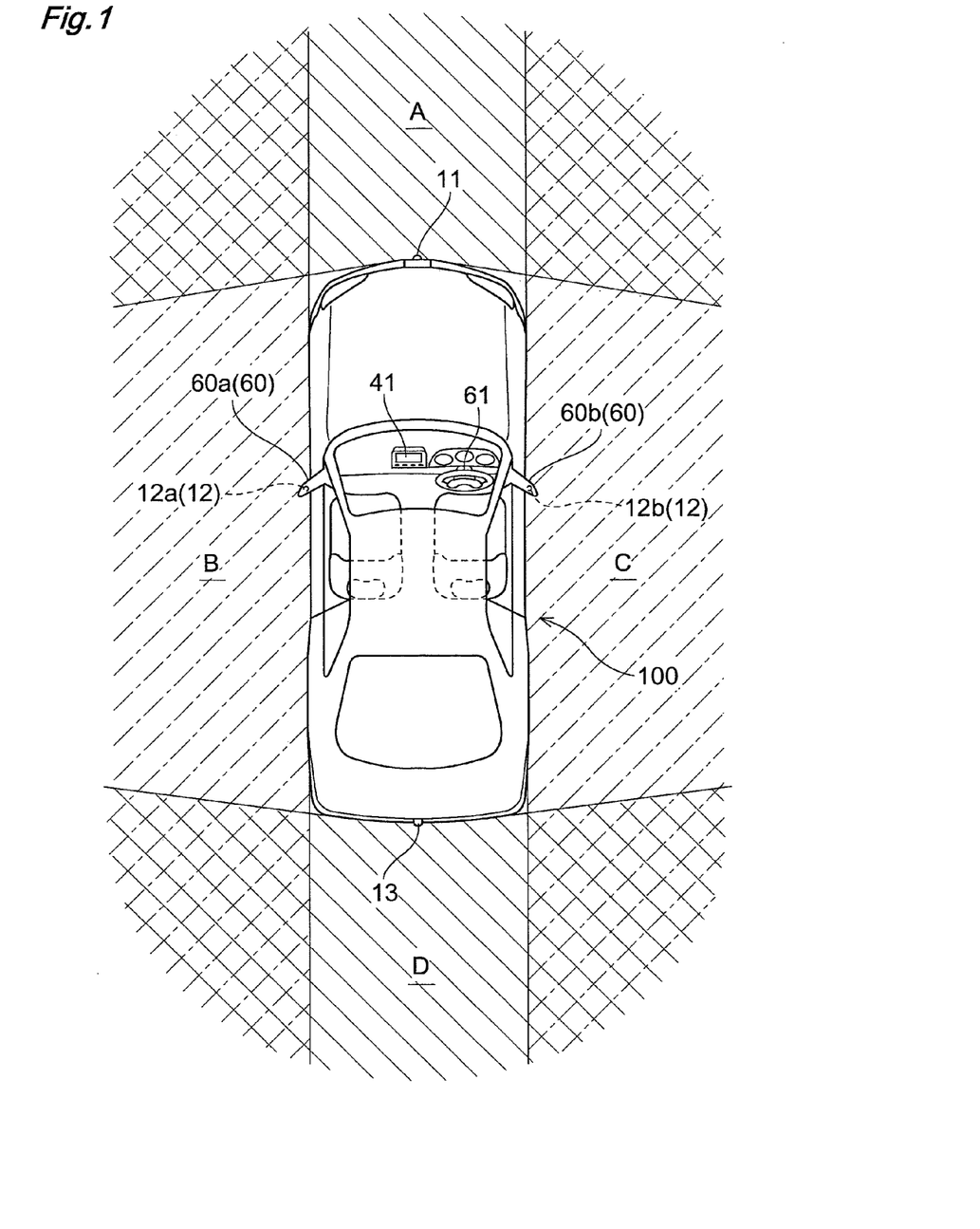
FIG. 1 is a view schematically showing a vehicle mounting a vehicle periphery image generation apparatus.

Next, an embodiment of the present invention will be described in details. FIG. 1 is a bird's eye view schematically showing a vehicle 100 mounting a vehicle periphery image generation apparatus 50 relating to the present invention. The vehicle 100 mounts, as "a camera device 1", a front camera 11, side cameras 12, and a rear camera 13. The front camera 11 obtains a photographic image of the view forwardly of the vehicle 100. This front camera 11 is comprised of e.g. a CCD camera, etc. And, such front camera 11, as shown in FIG. 1, is mounted to a front portion (e.g. a front grill) of the vehicle 100. Preferably, the front camera 11 is comprised with using a fish-eye lens. And, in such case, the camera 11 obtains a photographic image of the view over at least the area indicated by a mark A in FIG. 1.

The side cameras 12 are mounted to side mirrors 60 included in the vehicle 100. The side cameras 12 include a pair of side cameras 12a, 12b (left side camera 12a and right side camera 12b) for obtaining photographic images of the views on the left side and the right side of the vehicle 100, including the views of the perpendicularly lower sides of the side mirrors 60. In the instant embodiment, as shown in FIG. 1, the side camera mounted to the left side mirror 60a relative to the traveling direction of the vehicle 100 is referred to as the left side camera 12a and the side camera mounted to the right side mirror 60b relative to the traveling direction is referred to as the right side camera 12b, respectively. Further, when there is no need in particular to limit the side camera to either the left side camera 12a or the right side camera 12b, the side cameras will be referred to simply as the side camera 12.

The left side camera 12a obtains an image of the view on the left side of the vehicle 100 including the view of the area perpendicularly downward of the left side mirror 60a. Similarly to the front camera 11 described above, the side cameras 12 too are preferably comprised, with using fish-eye lenses. In such case, the left side camera 12a will obtain a photographic image of the view of at least the area indicated by a mark B in FIG. 1. The right side camera 12b obtains an image of the view on the right side of the vehicle 100 including the view of the area perpendicularly downward of the right side mirror 60b. The right side camera 12b will obtain a photographic image of the view of at least the area indicated by a mark C in FIG. 1

The rear camera 13 obtains an image of the view rearwardly of the vehicle 100. The rear camera 13, as shown in FIG. 1, is mounted to a rear portion (e.g. a rear bumper, a mall attached to a rear portion) of the vehicle 100. Preferably, this rear camera 100 too is comprised with using e.g. a fish-eye lens. In such case, the rear camera 13 will obtain a photographic image of the view of at least the area indicated by a mark D in FIG. 1. In this way, it is possible arrange such that the areas to be photographed by the respective cameras are caused to overlap with each other at the mutual borders thereof. Further, though not shown, it is alternatively possible to arrange such that the areas A-D have no overlapping portions with each other.

Figure 2:
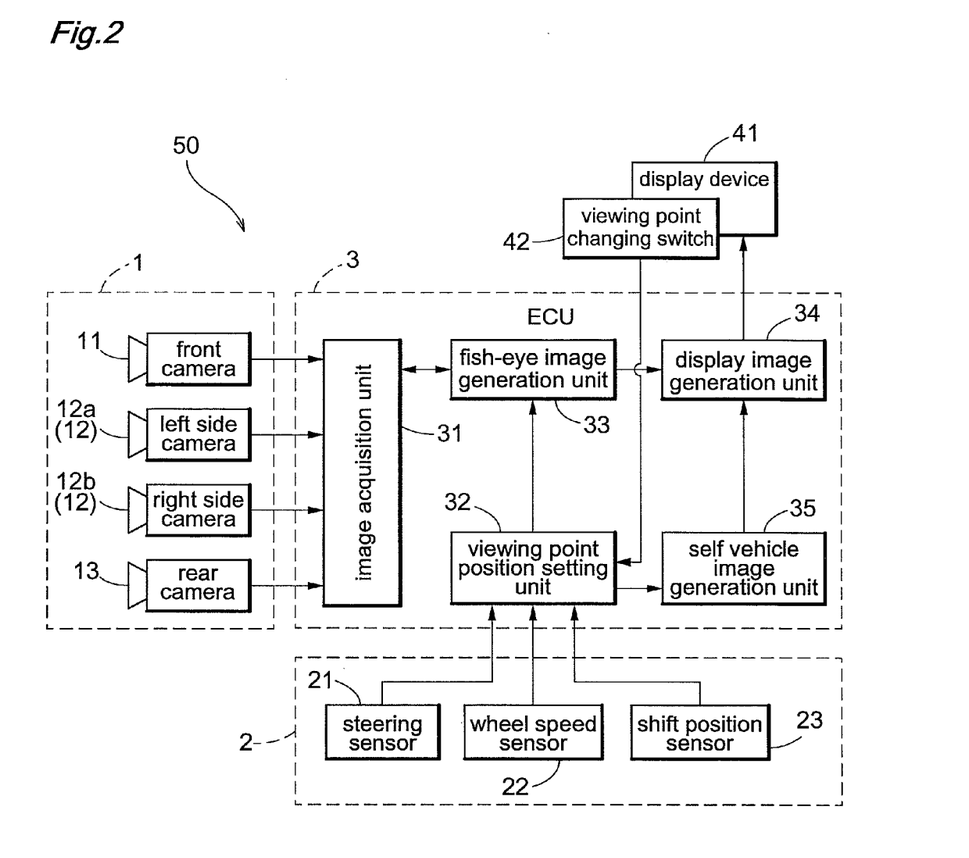
FIG. 2 is a block diagram schematically showing the vehicle periphery image generation apparatus.

The vehicle periphery image generation apparatus 50 relating to the present invention has the function of generating vehicle periphery images showing conditions surrounding the vehicle 100 suitable for the user, with using vehicle periphery images (photographic images) obtained by the front camera 11, the side cameras 12 and the rear camera 13 mounted on the vehicle 100 in the manners described above. FIG. 2 is a block diagram diagrammatically showing the schematic construction of the vehicle periphery image generation apparatus 50 according to the present invention.

The vehicle periphery image generation apparatus 50 includes the camera device 1, a sensor device 2, an ECU (electronic control unit) 3, a display device 41, and a viewing point changing switch 42. The camera device 1 is comprised of the front camera 11, the left side camera 12a, the right side camera 12b and the rear camera 13, as described above. The sensor device 2 is comprised of a steering sensor 21, a wheel speed sensor 22 and a shift position sensor 23. The ECU 3 is comprised of various functional units, including an image acquisition unit 31, a viewing point position setting unit 32, a fish-eye view image generation unit 33, a display image generation unit 34, and a self vehicle image generation unit 35. The inventive vehicle periphery image generation apparatus 50 configured as above is constituted from the above-described respective functional units including a CPU as its core component, for effecting various processes for generating vehicle periphery images showing the conditions around the vehicle 100, which units are constructed in the form of hardware and/or software.

The front camera 11, the left side camera 12a, the right side camera 12b and the rear camera 13 obtain photographic images capturing views including the views of at least the areas A-D (see FIG. 1). The photographic images thus obtained are transmitted to the image acquisition unit 31 which will be described later.

The steering sensor 21 is configured to detect a steering angle of a steering wheel 61 (see FIG. 1) included in the vehicle 100. The language "steering angle" refers to a rotational angle of the steering wheel 61 which is rotated clockwise or counter-clockwise from its neutral state. The language "neutral state" refers to a condition where the direction of the steering wheel for wheels (not shown) included in the vehicle 100 is parallel with the vehicle width, that is, where the vehicle 100 can travel straight. The steering sensor 21 for detecting such rotational angle of the steering wheel 61 can be constructed with using a hall element. The hall element is a device configured to detect a magnetic flux with utilizing the Hall effect that generates an electromotive force in accordance with a force received to move the load in the conductor laterally in response to application of a magnetic field to the conduction in which an electric current is flowing.

In the case of using such hall element as above, preferably, permanent magnets are arranged around the rotational shaft of the steering wheel 61, so that the hall element detects a magnetic field which varies according to the rotation of the steering wheel 61. Further, since the detection result outputted from the hall element is an electric signal, the steering sensor 21 calculates the steering angle of the steering wheel 61 based upon this detection result. This steering angle calculated by the steering sensor 21 will be transmitted to the viewing point position setting unit 32 which will be described later.

The vehicle speed sensor 22 effects detection of the rotational speed of the wheel included in the vehicle 100. This vehicle speed sensor 22, like the steering sensor 21 described above, can be constructed with using a hall element, so that the rotational speed of the wheels can be detected appropriately. Preferably, the vehicle speed sensor 22 can be provided for the rotational shaft of each one of the left front wheel and the right front wheel. With provision of the sensors for the rotational shafts of the both of the right and left wheels, it becomes possible to detect a forward traveling and turnings with distinction therebetween. For instance, when the rotational speeds of the right and left two wheels are found same, it may be determined that the vehicle is now traveling straight. Whereas, when a difference is found between the rotational speeds of the right and left wheels, it may be determined that the vehicle is now turning toward the side of the lower rotational speed. Meanwhile, the vehicle speed sensor 22 may be provided only to either the rotational shaft of the front wheel or the rotational shaft of the rear wheel included in the vehicle 100. The detection result of the wheel speed detected by the wheel speed sensor 22 will be transmitted to the viewing point position setting unit 32 which will be described later.

The shift position sensor 23 effects detection of a shift position of a shift lever (not shown) provided in the vehicle 100. The shift lever, in this embodiment, is provided as a shift lever configured for effecting switching of gears included in an AT (Automatic Transmission) mechanism. Such AT mechanism includes a drive line fixed inside a speed changer, and includes a range [P] used mainly for parking, an [R] range used for reversing, an [N] range for rendering the inside of the speed changer free, thus not transmitting the power of the engine to the driving line at all, a range [D] used for normal traveling, a [2] range used when an engine braking is employed for e.g. traveling on a down slope, etc. for fixing the upper limit of shift-up to two speeds, and a [1] range used when a powerful engine braking is employed for e.g. traveling on a steep down slope, etc. and fixing the gear in the first speed. The AT mechanism is configured to be capable of outputting output voltages corresponding respective to the shift positions corresponding to these shift ranges and the shift position sensor 23 is capable of detecting the current shift position by detecting this output voltage. The result of the detection of the shift position detected by the shift position sensor 23 will be transmitted to the viewing point position setting unit 32 which will be described later.

The image acquisition unit 31 acquires the periphery images of the vehicle 100 obtained by the plurality of cameras 11-13 mounted on the vehicle 100. The photographic images (periphery images) obtained by the image acquisition unit 31 are stored in storage areas provided in this image acquisition unit 31 to be read out (extracted) therefrom when needed for use by a fish-eye image generation unit 33 to be described later. Incidentally, if desired, the photographic images stored in the image acquisition unit 31 may be erased upon lapse of a predetermined period as measured from its storage or may be erased by a user's switching operation or the like. Alternatively, the capacity of the storage area may be set to a predetermined fixed value, so that storing and erasing may be effected by the so-called FIFO (First-In-First-Out) method.

The viewing point position setting unit 32, though will be described in greater details later, is provided for setting the position of a viewing point of an image to be displayed on the display device 41 provided in the vehicle interior of the vehicle 100 for displaying images. This setting of viewing point is effected, based on the detection result of the position of the steering wheel 61 transmitted from the steering sensor 21, the detection result of the wheel speed transmitted from the wheel speed sensor 22, the detection result of the shift position of the shift lever transmitted from the shift position sensor 23, or in response to a user's operation on the viewing position changing switch 42.

For instance, when the viewing point setting is to be effected based upon the detection result of the steering sensor 21, preferably, the viewing point may be set to the forward side of the vehicle 100 which is upstream in the steering of the steering wheel 61 (this corresponds to the left forward side of the vehicle 100 when the steering wheel 61 is rotated clockwise or corresponds to the right forward side of the vehicle 100 when the steering wheel 61 is rotated counter-clockwise). With this setting of the viewing point, visual recognition of an object present at blind corners can be facilitated, advantageously.

Or, when the setting of the viewing point is to be effected based on the detection result of the wheel speed sensor 23, preferably, the setting of the viewing point may be made such that the lower the wheel speed of the vehicle 100, the greater the visibility of the vicinity in the traveling direction of the vehicle 100. In general, the vehicle 100 will be driven at a lower moving speed when an obstacle or the like is present in the vicinity of the vehicle 100. Therefore, with the above-described setting of the viewing point, the blind corners can be made more easily visible.

Further, according to another setting of the viewing point, the viewing point may be set to a viewing point for forward traveling in case the position of the shift lever 11 is located at one of the forward traveling positions, namely, one of the ranges of the AT mechanism, i.e. the [D] range, [2[ range, [1] range. Whereas, the viewing point may be set to a viewing point for reverse traveling in case the position of the shift lever 11 is located at least at the position for reverse traveling, that is, at the reverse range [R] of the AT mechanism. With this setting, the visibility of an object which may be present at a blind corner corresponding to the traveling direction may be enhanced.

In the above, though will be detailed later, with the vehicle periphery image generation apparatus 50 of the invention, the view in the periphery of the vehicle 100 as seen from the perpendicularly upwardly of the vehicle 100 can be displayed as a fish-eye image on the display device 41. And, the perpendicularly upward side of the vehicle 100 may be selectively switched to the perpendicularly upward side of the center portion of the vehicle 100, the perpendicularly upward side of the front portion of the same, or the perpendicularly upward side of the rear portion of the same. Further, the perpendicularly upward side can be selectively switched also to perpendicularly upward position distant by a predetermined distance from the side portion of the vehicle 100. This viewing point switchover is possible by a user's depressing operation on the viewing point changing switch 42. In the instant embodiment, there will be explained an exemplary case wherein the viewing potion from the perpendicularly upward side of the center portion of the vehicle 100 is set as a "default" setting.

The fish-eye view image generation unit 33 generates a fish-eye image with a viewing point at a position set by the viewing point setting unit 32 with using the periphery images. The language "periphery images" refers to photographic images obtained by photographing the periphery of the vehicle 100. As described hereinbefore, the photographic images are stored in the image acquisition unit 31. The position setting by the viewing point position setting unit 32 refers to the position perpendicularly upward of the center portion of the vehicle 100, in the case of this embodiment. The fish-eye image refers to an image which is obtained e.g. by photographing with using a so-called fish-eye lens, which image has a greater image distortion as it extends from the center thereof toward the periphery thereof. Therefore, with using the periphery images stored in the image acquisition unit 31, the fish-eye image generation unit 33 generates a fish-eye image with the viewing point at the position perpendicularly upward of the center portion of the vehicle 100. The fish-eye image generated by the fish-eye image generation unit 33 is transmitted to the display image generation unit 34 which will be described later.

The self vehicle image generation unit 35 generates a self vehicle image showing the self vehicle. Here, the "self vehicle" refers to a vehicle 100 mounting the inventive vehicle periphery image generation apparatus 50. The self vehicle image is an image shown within the screen displayed on the display device 41 for making it easy for the user to identify the self vehicle. This self vehicle image may be a reduced image of the vehicle 100 or may be comprised of points showing the four corners of the vehicle 100. Needless to say, this may be shown as an image of any other different shape (e.g. a rectangular shape, etc.). In this embodiment, there will be described a case wherein the vehicle 100 is shown as a reduced image. The self vehicle image generation unit 35 generates such self vehicle image and transmits this to the display image generation unit 34 which will be described later.

The display image generation unit 34 generates a display image to be displayed on the display device 41 with using the fish-eye image and the self vehicle image. The fish-eye image is transmitted from the fish-eye image generation unit 33 described above. The self vehicle image is transmitted from the self vehicle image generation unit 35. The display image generation unit 34 generates the display image with placing the self vehicle image in superposition on the fish-eye image. The resultant display image thus generated is displayed on the display device 41.

Figure 3:
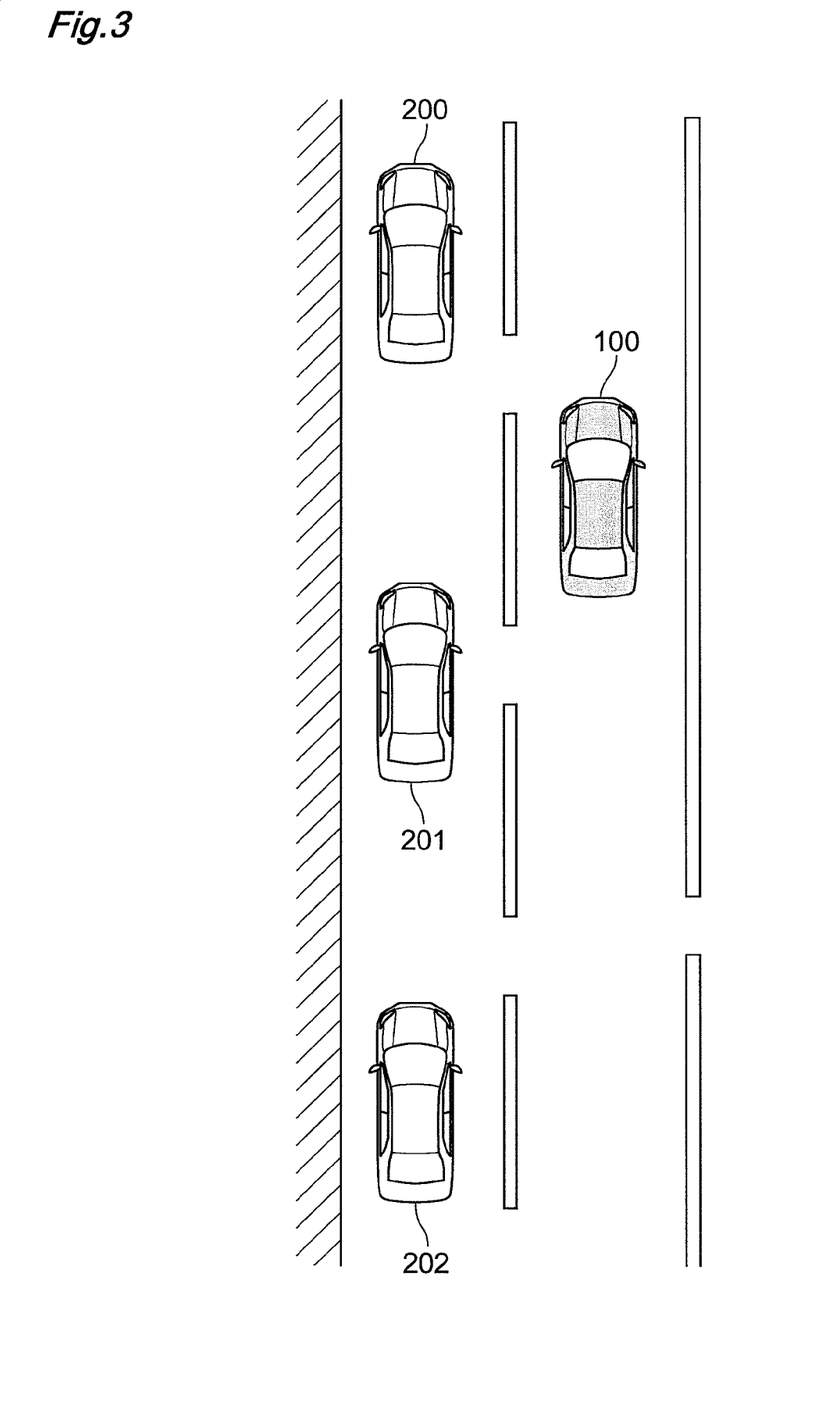
FIG. 3 is a view schematically showing a current position of the vehicle.
Figure 4:
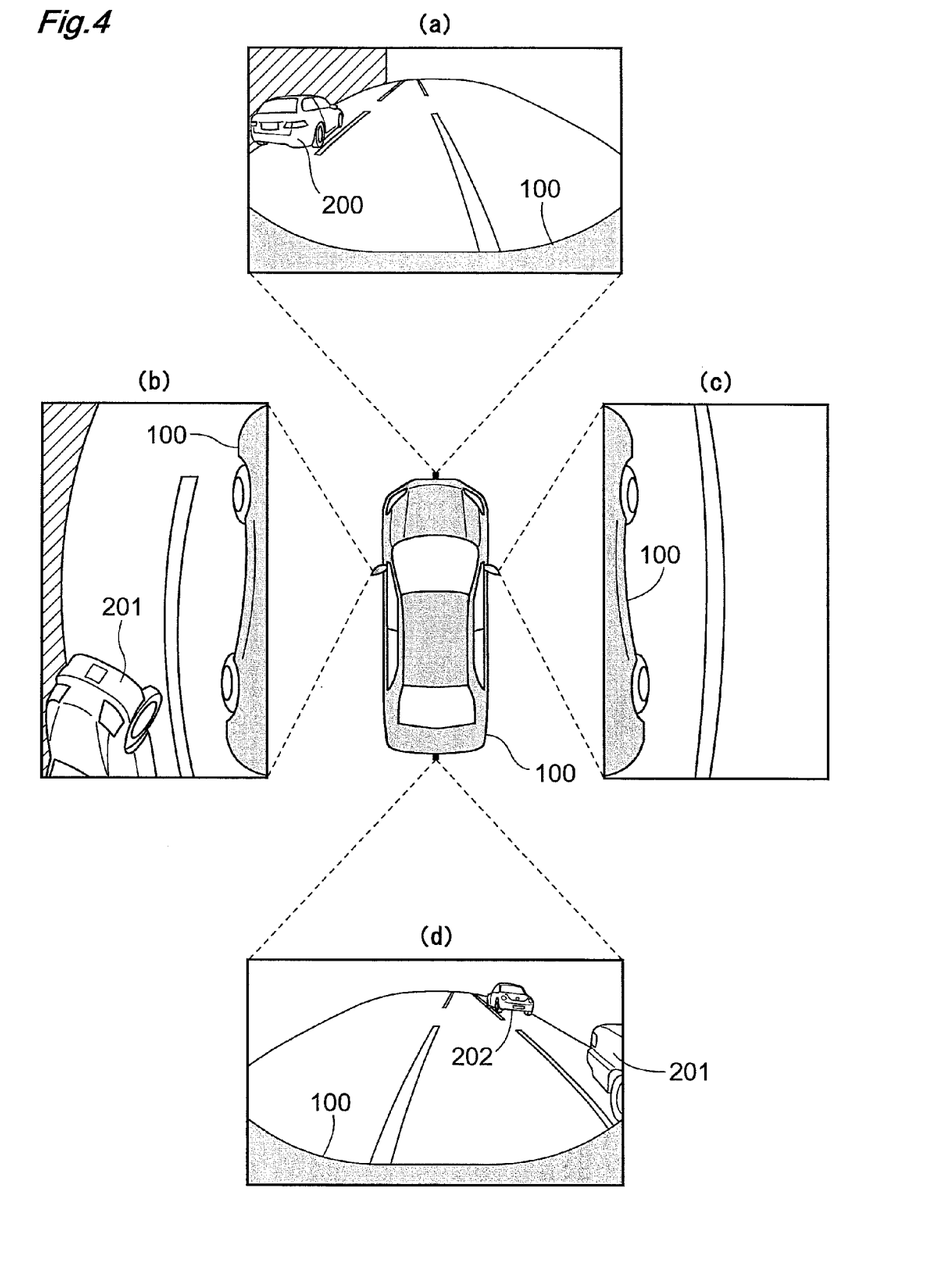
FIG. 4 is a view showing examples of photographic images obtained by respective cameras.

Next, the image displayed on the display device 41 will be explained with reference to the drawing. FIG. 3 is a view which schematically shows a current position of the vehicle 100. Meanwhile, this drawing does not show the image to be actually displayed on the display device 41, but shows only an image provided for facilitated understanding of the image displayed on the display device 41. As shown in FIG. 3, on the left forward side of the vehicle 100, another vehicle 200 is parked. On the left rear side of the vehicle 100, still another vehicle 201 is parked. On the further rear side of the vehicle 201, still another vehicle 202 is parked. FIG. 4 shows photographic images obtained by the respective cameras 11-13 in this situation.

FIG. 4(*a*) shows the photographic image obtained by the front camera 11 provided in the vehicle 100. As shown in FIG. 4(*a*), the photographic image obtained by the front camera 11 includes the vehicle 200. Further, FIG. 4(*b*) shows the photographic image obtained by the left side camera 12*a* provided in the vehicle 100. As shown in FIG. 4(*b*), the photographic image obtained by the left side camera 12*a* includes portions of the left wheels of the vehicle 100 and a portion of the vehicle 200. FIG. 4(*c*) shows the photographic image obtained by the right side camera 12*b* provided in the vehicle 100. As shown in FIG. 4(*c*), the photographic image obtained by the right side camera 12*b* includes portions of the right wheels of the vehicle 100. FIG. 4(*d*) shows the photographic image obtained by the rear camera 13 provided in the vehicle 100. As shown in FIG. 4(*d*), the photographic image obtained by the rear camera 13 includes the vehicle 201 and the vehicle 202. The photographic images as above are obtained by the respective cameras 11-13 and stored in the image acquisition unit 31.

Figure 5:
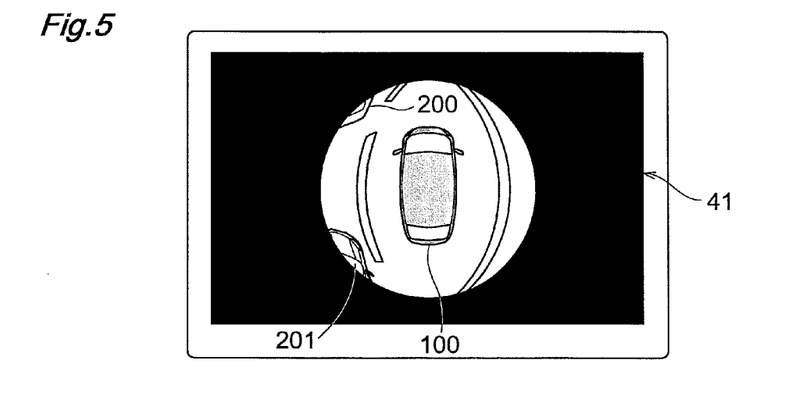
FIG. 5 is a view showing an example of a fish-eye image generated by the vehicle periphery image generation apparatus.

With the photographic images described above (especially, the photographic image obtained by the front camera 11 and the photographic image obtained by the rear camera 13), the immediate vicinities of the vehicle 100 become "blind corners". So, the confirmation of safety of the periphery of the vehicle 100 using these photographic images cannot be said to be perfect. That is, depending on the case, an obstacle such as a human or an object present in the periphery of the vehicle 100 might be overlooked. On the other hand, with a simple arrangement of showing an image from the perpendicularly upward position of the vehicle 100 based on the photographic images obtained by the respective cameras 11-13, the confirmation of the far side of the vehicle 100 becomes impossible. Then, in the case of the vehicle periphery image generation apparatus 50 according to the present invention, the display device 41 is caused to display an image that can show not only the extreme vicinities of the vehicle 100, but also positions far from the vehicle 100. FIG. 5 shows such image.

FIG. 5 shows an image with a viewing point set at a position perpendicularly upward of the vehicle 100 and this view is comprised of a fish-eye view. Namely, the image is formed such that the viewing point of the fish-eye image is a viewing point from the perpendicularly upper direction. This fish-eye image is generated by the fish-eye image generation unit 33 based upon the photographic images obtained by the respective cameras 11-13 and stored at the image acquisition unit 31. The fish-eye image shown in FIG. 5 includes the vehicle 200 and the vehicle 201 and includes also the extreme vicinities of the vehicle 100 as being visible therein. Further, as this is a fish-eye image, it includes also positions distant by certain extent from the vehicle 100. Therefore, it is possible for the user to confirm both the extreme vicinities of the vehicle 100 and the positions distant therefrom in a single image.

Figure 6:
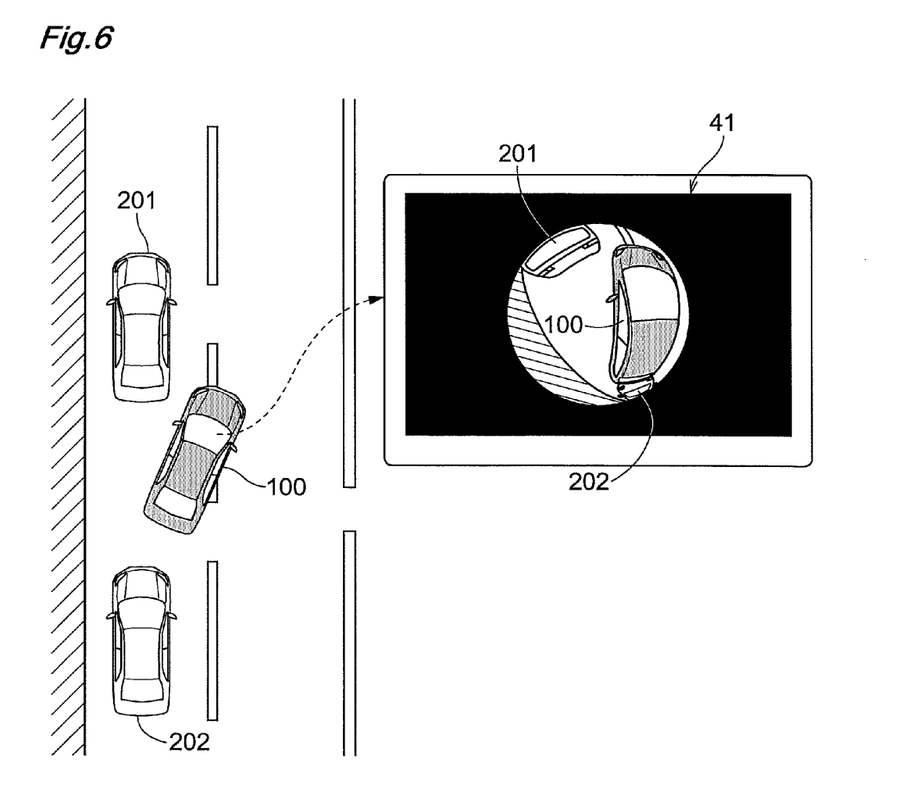
FIG. 6 is a view showing an example of fish-eye image whose viewing point has been changed.

Further, with the inventive vehicle periphery image generation apparatus 50, the viewing point position of the fish-eye image can be changed. For instance, if the vehicle 100 is to be parked at a space available between the vehicle 201 and the vehicle 202 in the illustration shown on the left side of FIG. 6, the fish-eye image generation unit 33 can generate the fish-eye image as shown on the right side in FIG. 6 to be displayed on the display device 41. With such appropriate change of the viewing position, it is possible for the user to observe the space between the vehicle 100 and the vehicle 201. Further, upon setting of a viewing position, there will be generated a self vehicle image showing the vehicle 100 in the form of a fish-eye image with the position set by the viewing point position setting unit 32 as the viewing point. Therefore, the visual confirmation of the periphery of the vehicle 100 can be made appropriately.

OTHER EMBODIMENTS

In the foregoing embodiment, there has been exampled generation of the fish-eye image based upon photographic images obtained by the respective cameras 11-13. If each camera 11-13 has a fish-eye lens, the fish-eye image relating to the present invention may be generated through synthesis of photographic images obtained by the respective cameras 11-13. Further, needless to say, whether the lens of each camera 11-13 is a fish-eye lens or not, a top view image like a plan view may be generated, and these images may be rendered into a fish-eye image later.

Figure 7A:
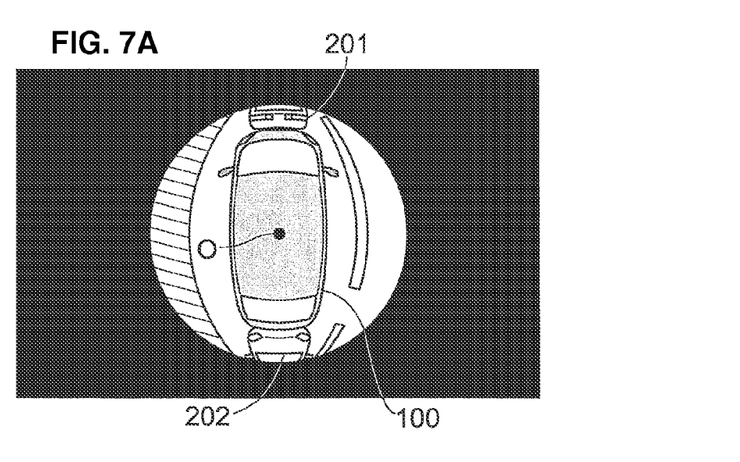
FIG. 7A-7C is a view showing examples of fish-eye images whose viewing points have been changed.
Figure 7B:
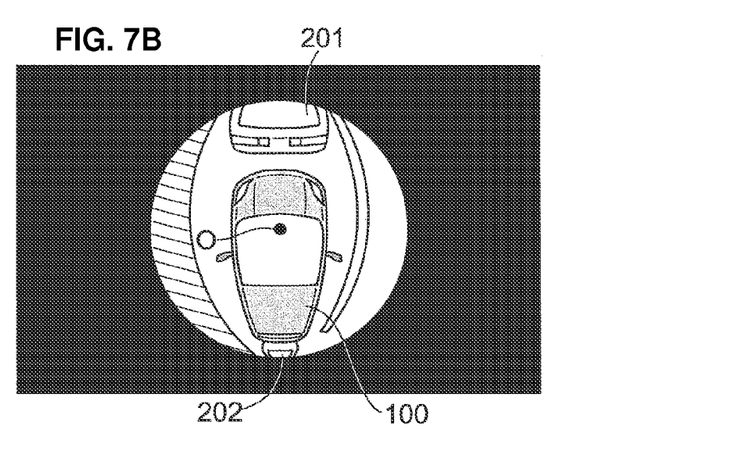
Figure 7C:
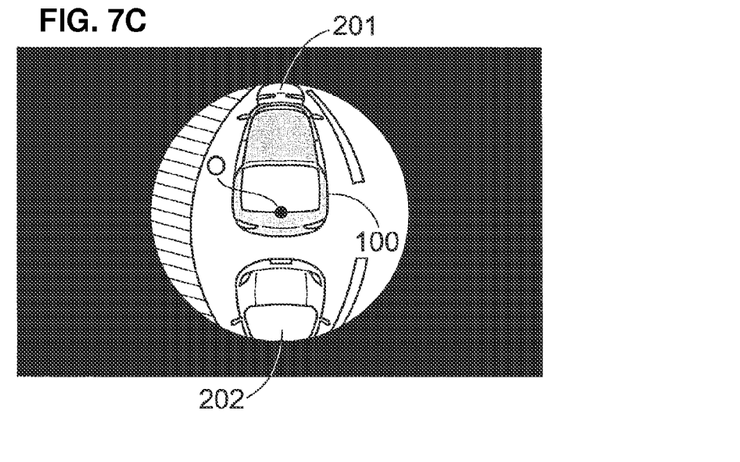

In the foregoing embodiment, there has been explained that the viewing point position of the fish-eye image can be changed by the user's operation on the viewing point changing switch 42. This viewing point changing switch may be configured to change the viewing point in a flexible manner in response to an operation of an input device such as a so-called "cross key". With such configuration, in response to a user's operation of the "cross-key", as shown in FIG. 7(a), it becomes possible to display a fish-eye image with the viewing point position being set forwardly and upwardly of the vehicle 100 (the perpendicularly upward of O in FIG. 7(a)). Further, as shown in FIG. 7(b), it becomes possible to display a fish-eye image with the viewing point position being set forwardly and upwardly of the vehicle 100 (the perpendicularly upward of O in FIG. 7(b)). Furthermore, as shown in FIG. 7(c), it becomes possible to display a fish-eye image with the viewing point position being set forwardly and upwardly of the vehicle 100 (the perpendicularly upward of O in FIG. 7(c)). As a matter of course, it is also possible to provide a mode selection switch in order to allow selection and displaying of the viewing point position when desired or needed. In this FIG. 7, there was explained the arrangement of the viewing point position being changeable within the horizontal plane normal to the perpendicular direction. Instead, the viewing point position may be made changeable along the perpendicular direction (height direction).

Further, the self vehicle image generation unit 35 may be configured to be generate the self vehicle image with its length reduced. With the generation of the self vehicle image in this manner, the resultant fish-eye image will allow even easier recognition of the forward and the rear sides of the vehicle 100.

In the foregoing embodiment, there was explained that the viewing point of the fish-eye image is a viewing potion from the perpendicularly upward side. However, the applicable range of the present invention is not limited thereto. For instance, it is also possible as a matter of course to use a position from an obliquely upward side as the viewing point of the fish-eye image.

In the foregoing embodiment, it was explained that the fish-eye image is generated by the fish-eye image generation unit 33. As described hereinbefore, a fish-eye image is an image obtained when the image is obtained with using a so-called fish-eye lens, i.e. a convex type image. For the production of such fish-eye image, this can be generated by projecting and converting the periphery images of the vehicle 100 photographed by the plurality of photographic cameras 11-13 directly onto a convex face. Further alternatively, the periphery images of the vehicle 100 photographed by the plurality of photographic cameras 11-13 may be projected and converted onto a flat plane and these are then combined and synthesized into a synthesized image (e.g. the so-called "top view image") and then this synthesized image may be projected and converted onto a convex plane, thereby to generate the fish-eye image.

INDUSTRIAL APPLICABILITY

The present invention is applicable to a vehicle periphery image generation apparatus for generating the vehicle periphery image that can command a wide view of the vehicle image at a time.

DESCRIPTION OF REFERENCE MARKS

1: camera device
2: sensor device
3: ECU (Electronic Control Unit)
11: front camera
12: side camera
12a: left side camera
12b: right side camera 13: rear camera
21: steering sensor
22: wheel speed sensor
23: shift position sensor
31: image acquisition unit
32: viewing point position setting unit
33: fish-eye image generation unit
34: display image generation unit
35: self vehicle image generation unit
41: display device
42: viewing point position changing switch
50: vehicle periphery image generation apparatus

The invention claimed is:

1. A vehicle periphery image generation apparatus comprising:
    an image acquisition unit for acquiring vehicle periphery images photographed by a plurality of photographic cameras mounted on the vehicle;
    a display device provided in the vehicle interior for displaying the images;
    a viewing point position setting unit for setting the position as the viewing point of the image to be displayed on the display device to a viewing point from a perpendicular upward direction;
    a fish-eye image generation unit for generating a fish-eye image with using the periphery image and the position set by the viewing point position setting unit;
    a self vehicle image generation unit for generating a self vehicle image as the fish-eye image with the position set by the viewing point position setting unit as the viewing point thereof; and
    a display image generation unit for generating an image to be displayed on the display device with using the fish-eye image and a self vehicle image, wherein the position of the viewing point of the fish-eye image can be changed;
    the viewing point position setting unit sets the viewing point based on a detection result of a wheel speed sensor and changes the viewing point such that a visibility of the vicinity in the travelling direction of the vehicle increases when a detected wheel speed of the vehicle decreases.

2. The vehicle periphery image generation apparatus according to claim 1, wherein the viewing point position is changed within a horizontal plane normal to the perpendicular direction.

3. The vehicle periphery image generation apparatus according to claim 1, wherein the self vehicle image generation unit generates the self vehicle image with its length reduced.

4. The vehicle periphery image generation apparatus according to claim 1, wherein the position of the viewing point of the fish-eye image can be changed in response to a user's operation.

5. The vehicle periphery image generation apparatus according to claim 1, wherein the position of the viewing point of the fish-eye image can be changed, in accordance with result of detection by a sensor device mounted on the vehicle.

6. The vehicle periphery image generation apparatus according to claim 1, wherein the viewing point position setting unit sets the viewing point based on a detection result of a steering sensor, and sets the viewing point to a forward side of the vehicle which is upstream in direction of steering of a steering wheel.

* * * * *